(12) United States Patent
Denson et al.

(10) Patent No.: US 9,089,093 B2
(45) Date of Patent: Jul. 28, 2015

(54) SPRING TINE WITH INTEGRATED RELIEF SECTION

(71) Applicant: AGCO Corporation, Duluth, GA (US)

(72) Inventors: Shane Dalton Denson, Buhler, KS (US); Allen Joseph Kuhn, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 53 days.

(21) Appl. No.: 13/797,309

(22) Filed: Mar. 12, 2013

(65) Prior Publication Data

US 2014/0260170 A1  Sep. 18, 2014

(51) Int. Cl.
*A01D 89/00* (2006.01)
*A01D 80/02* (2006.01)

(52) U.S. Cl.
CPC ............... *A01D 80/02* (2013.01); *A01D 89/00* (2013.01); *A01D 89/002* (2013.01)

(58) Field of Classification Search
USPC ......... 56/14.4, 16.1, 220, 227, 364, 372, 400, 56/400.02, 400.21, DIG. 20; 100/100, 173
See application file for complete search history.

(56) References Cited

U.S. PATENT DOCUMENTS

| | | | | |
|---|---|---|---|---|
| 1,497,526 | A * | 6/1924 | Martin | 56/400 |
| 2,036,807 | A * | 4/1936 | Honn | 56/400.01 |
| 2,908,129 | A * | 10/1959 | Van Der Lely et al. | 56/377 |
| 3,511,362 | A * | 5/1970 | Gaeddert et al. | 198/693 |
| 3,705,483 | A * | 12/1972 | Jarrell et al. | 56/13.5 |
| 4,161,859 | A * | 7/1979 | Storm et al. | 56/364 |
| 4,467,591 | A * | 8/1984 | Dynie | 56/16.4 R |
| 4,606,180 | A * | 8/1986 | Archer | 56/400.11 |

* cited by examiner

*Primary Examiner* — Thomas B Will
*Assistant Examiner* — Mai Nguyen

(57) ABSTRACT

A spring tine for use on the pickup assemblies of crop baling machines and the like comprises a single, continuous strand of resilient material formed into a base of multiple, side-by-side, helical coils and an elongated leg projecting outwardly from the base. The leg is formed to present a relief notch in an inner section of the leg adjacent the base for avoiding interference with a support member for the tine when the tine springs back and forth during operation.

18 Claims, 6 Drawing Sheets

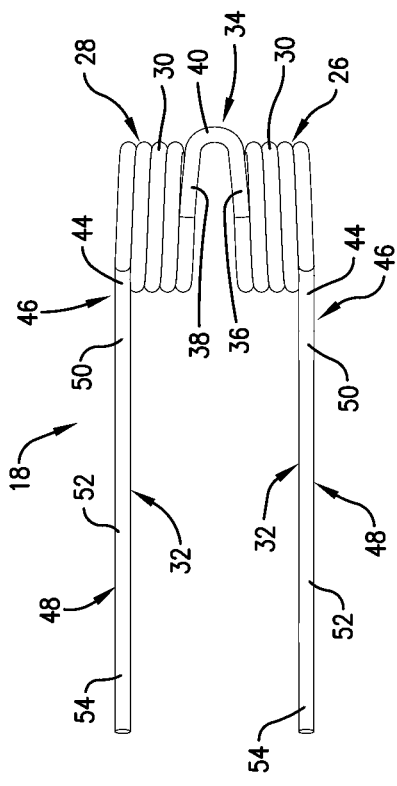
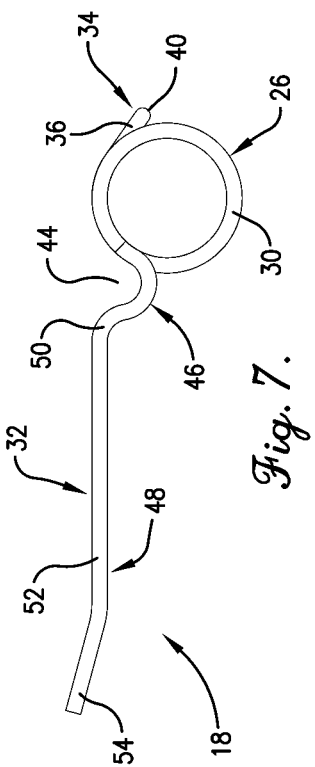
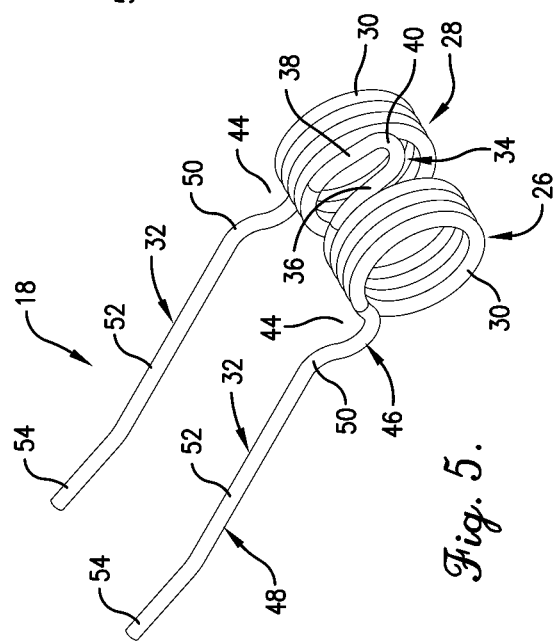

ns with the support
SPRING TINE WITH INTEGRATED RELIEF SECTION

TECHNICAL FIELD

The present invention relates to the field of harvesting equipment and, more particularly, to improvements in the tines of windrow pickup assemblies of the type typically utilized on round and square balers and other haying equipment.

BACKGROUND AND SUMMARY

Pickup assemblies typically use resilient wire tines on a rotating reel to lift windrowed crop materials off the ground and up into baling mechanism or the like as the machine advances across a field. The tines are mounted on support members in the form of bars that extend along the length of the reel in parallel relationship to one another and move in a circular path of travel as the reel rotates. The support bars can oscillate back and forth about their longitudinal axes as the reel rotates, and cam mechanism connected with the support bars controls their oscillation in such a manner that the tines move downwardly through a generally vertical retracting motion at the upper rear extremity of their path of travel to strip out of the flowing crop material and then flip out to a generally radial position along the lower part of the back stretch to prepare for a subsequent forward and upward sweeping motion through ground-lying crop materials.

Typically, such pickup reels utilize four support bars per reel. Although such four-bar reels have the performed adequately for many years, for a number of reasons it would be desirable to have more than four tine bars on the reel. However, increasing the number of bars to five or six bars, for example, may lead to a space problem during the retracting, strip out portion of the tines' path of travel. If the support bars are arranged too close together around the reel in an effort to increase the number of bars and tines, the legs of the tines on one bar may strike the immediately trailing bar during the strip out action. But, reconfiguring each tine so its leg avoids striking the trailing bar may cause other problems.

In this respect, as the tine lifts crop materials off the ground, its leg flexes downwardly to some extent under the load of the crop materials. When such loading is suddenly removed at the top of the reel when the tine releases the crop, the tine leg snaps back forwardly well beyond its original unloaded position. If the tine leg is too close to its own support bar due to reconfiguration of the tine for interference avoidance purposes, the tine leg may strike the top edge of its support bar so sharply that the leg completely breaks off.

The present invention overcomes this problem by providing a special shape to each leg of the tine. Adjacent the inner end of the tine leg where it joins coils at the base of the tine, the tine leg is provided with a relief notch that clears the top edge of its support bar when the tine leg snaps back forwardly during release of the picked up crop materials. Thus, an increased number of tine bars can be provided in the reel, the tines can be reconfigured to avoid interfering with the trailing bar during oscillation, and noise, premature wear and breakage of the tines from striking the edge of their own support bar can be avoided. With the increased number of tine bars and tines, the pickup assembly has a greater number of tines engaging the crop during each revolution of the reel, which significantly increases the quality and thoroughness of pick up, especially in light and short crop conditions. Moreover, it also means that, with more tines for the same amount of crop material, each tine is not worked as hard as in prior designs, thereby prolonging its useful life.

BRIEF DESCRIPTION OF THE DRAWINGS

FIG. 5 is a top, left isometric view of one of the tines detached from its support bar;

FIG. 6 is a top plan view of the tine;

FIG. 7 is a left, end elevational view of the tine; and

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. Directional references such as "left" and "right" in this specification are given as if the machine were being viewed from the rear looking forwardly.

Figure 1:
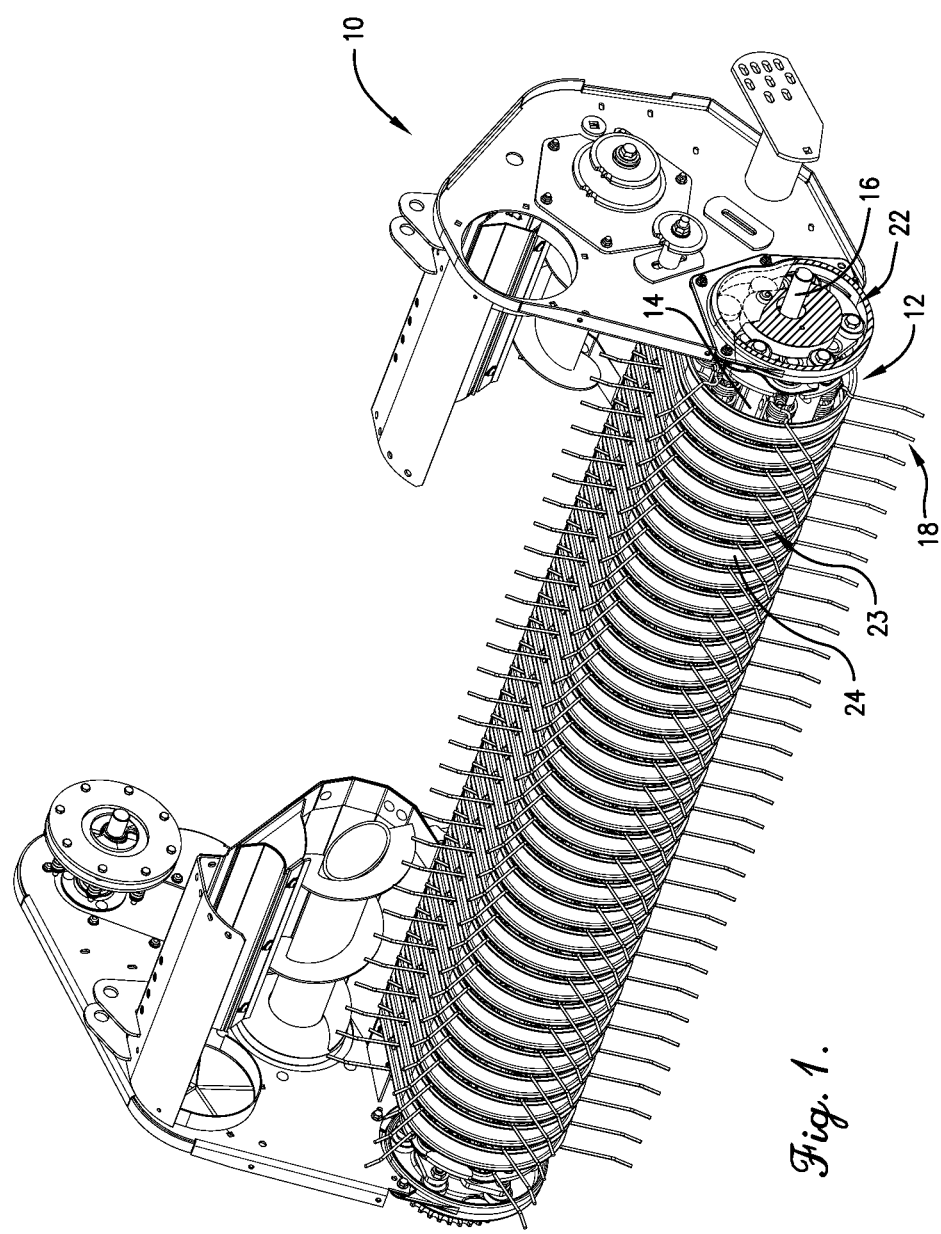
FIG. 1 is a left, front isometric view of a partially assembled crop pickup assembly employing tines constructed in accordance with the present invention.
Figure 2:
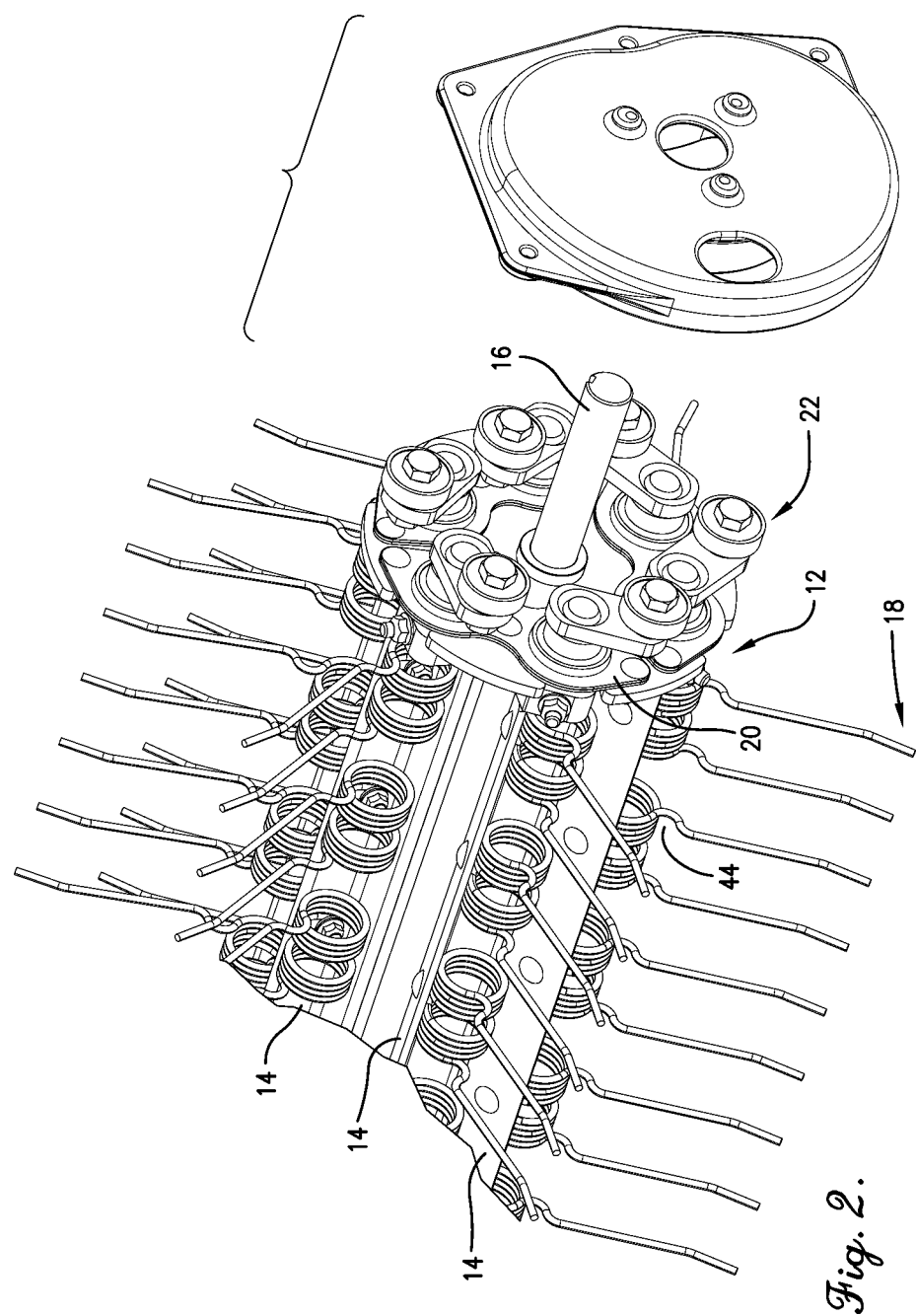
FIG. 2 is a fragmentary, enlarged left front isometric view of the reel of the pickup assembly with a left end cam track illustrated in a removed position to reveal details of construction.

FIG. 1 shows a pickup header assembly 10 of the type that is adapted to be mounted on a hay handling machine such as a round or square baler. Among other things, pickup assembly 10 includes a reel 12 having a plurality of circularly spaced, parallel, right-angle, tine support bars 14 (preferably six bars) arranged in a circle about a central shaft 16. A multiplicity of tines 18 in accordance with the principles of the present invention are mounted at spaced locations along the length of each support bar 14.

Reel 12 rotates in a clockwise direction as viewed from the left end of pickup assembly 10 about the longitudinal axis of shaft 16. Thus, support bars 14 move in a clockwise, circular path of travel as reel 12 rotates during field operations, as viewed from the left side of the machine. However, although tines 18 move in a circular path of travel with bars 14, provision is made for having the outermost ends of tines 18 move in a generally downward vertical stripping or retracting action at the top of the back stretch of their path of travel. The tines 18 are then flipped back out radially along the lower half of the back stretch to prepare for the next forward sweeping movement into crop material on the ground. This is accomplished by having support bars 14 provided with stub shafts at their opposite ends that are journalled by bearings 20 to permit each bar 14 to oscillate about its longitudinal axis. Cam mechanism 22 at one or both ends of reel 12 is operably coupled with bars 14 to oscillate them in the predetermined, controlled manner during each revolution of reel 12.

A wrapper 23 in the form of a plurality of laterally spaced straps 24 is looped under the bottom, front, and top of reel 12 to provide a type of cover for reel 12 and support for the lifted crop materials, but the spacing between straps 24 is such as to allow tines 18 to project outwardly through the wrapper and into operating engagement with the crop materials. As the tines 18 travel around the upper part of the back stretch of their path of travel, they momentarily also rotate counter-clockwise so as to retract down through the slots between straps 24. As tines 18 then move along the lower half of the back stretch, they flip back out in a clockwise direction to once again project through wrapper 23 along the bottom, front, and top stretches of their path of travel.

Each tine 18 as illustrated herein is of double-leg construction, although it will be appreciated that the principles of the present invention are not limited to the number of legs provided by each tine. Each tine could be of single-leg construction or more than double-leg construction without departing from the principles of the present invention.

Each tine 18 comprises a continuous strand of resilient material, preferably metal wire, that is formed into a pair of end-to-end bases 26 and 28 presented by a series of side-by-side, helical coils 30. The coils 30 of one base 26 or 28 are spiraled in a clockwise direction, while the coils 30 of the other base 26 or 28 are spiraled in the opposite, counterclockwise direction. Each base 26, 28 has its own elongated tine leg 32 projecting outwardly therefrom, and the two bases 26, 28 are interconnected by a generally U-shaped, flattened mounting portion 34. Mounting portion 34 comprises a first flat arm 36 extending as a continuation of an end coil of base 26, a second flat arm 38 extending as a continuation of an end coil of base 28, and a common flat bight 40 that integrally joins arms 36, 38 together. Arms 36, 38 and bight 40 bear flatly against a flat surface 14a of support bar 14 when tine 18 is attached thereto, a threaded fastener 42 being used to clamp mounting portion 34 against flat surface 14a. It will be noted that within mounting portion 34, the direction of coiling of bases 26, 28 changes from clockwise to counterclockwise.

Each tine leg 32 is formed to present a relief notch 44 in an inner section 46 of the leg adjacent its corresponding base 26 or 28. Relief notch 44 generally faces the flat plane of mounting portion 34 so as to correspondingly face flat surface 14 a of support bar 14 and its proximate edge 14b when tine 18 is attached thereto. Within the coils 30 of each respective base 26 or 28, the strand is spiraled in a forward or first direction, while within notch 44 of the corresponding leg 32, the strand is curved in a reverse or second direction. Each notch 44 is thus reversely curved relative to the coils 30 of its base 26 or 28. Each leg 32 curves more than 90° within its notch 44 but less than 180°. In a preferred embodiment, the total curvature within each notch 44 is on the order of 120-150°. The radius of curvature of each notch 44 is one-third to one-half the radius of coils 30.

Each leg 32 also includes an outer section 48 that is outboard of notch 44 and inner section 46. A transition region 50 is presented between notch 44 and outer section 48, such transition region 50 curving back reversely of the direction of curvature of notch 44, i.e., in the same direction of curvature as the coils 30 associated with that particular leg 32. In effect, the two curves within notch 44 and transition region 50 present a gentle or "lazy" S-curve. The radius of curvature of transition region 50 is substantially the same as that of notch 44, although leg 32 curves substantially less than notch 44, e.g., something less than 90° such as approximately 75°.

The outer section 48 of each leg 32 includes a straight portion 52 that is several times longer than the length of the strand within notch 44. Preferably, straight portion 52 lies in a plane that is generally tangent to its corresponding base 26 or 28, the point of tangency being generally adjacent to mounting portion 34. Straight portion 52 forms an acute angle with the plane of mounting portion 34. The outer section 48 of each leg 32 further includes a tip portion 54 that is angled slightly forwardly relative to straight portion 52 with respect to the normal direction of rotation of reel 12 and the direction of crop flow.

It will be appreciated that each leg 32 comprises an extension of an endmost coil of the corresponding base 26 or 28, while the arm 36 of each base 26 or 28 comprises an extension of the opposite endmost coil of that particular base. Coils 30 of each base 26 or 28 are tightly wound so as to be disposed in abutting, side-by-side relationship to one another. Preferably, the strand that comprises each tine 18 is fabricated from oil-tempered class II steel wire. Preferably also, the strand comprises a single filament of material, although it could also take the form of multiple filaments woven together or otherwise cooperating to effectively present a length of material, without departing from the principles of the present invention.

Figure 3:
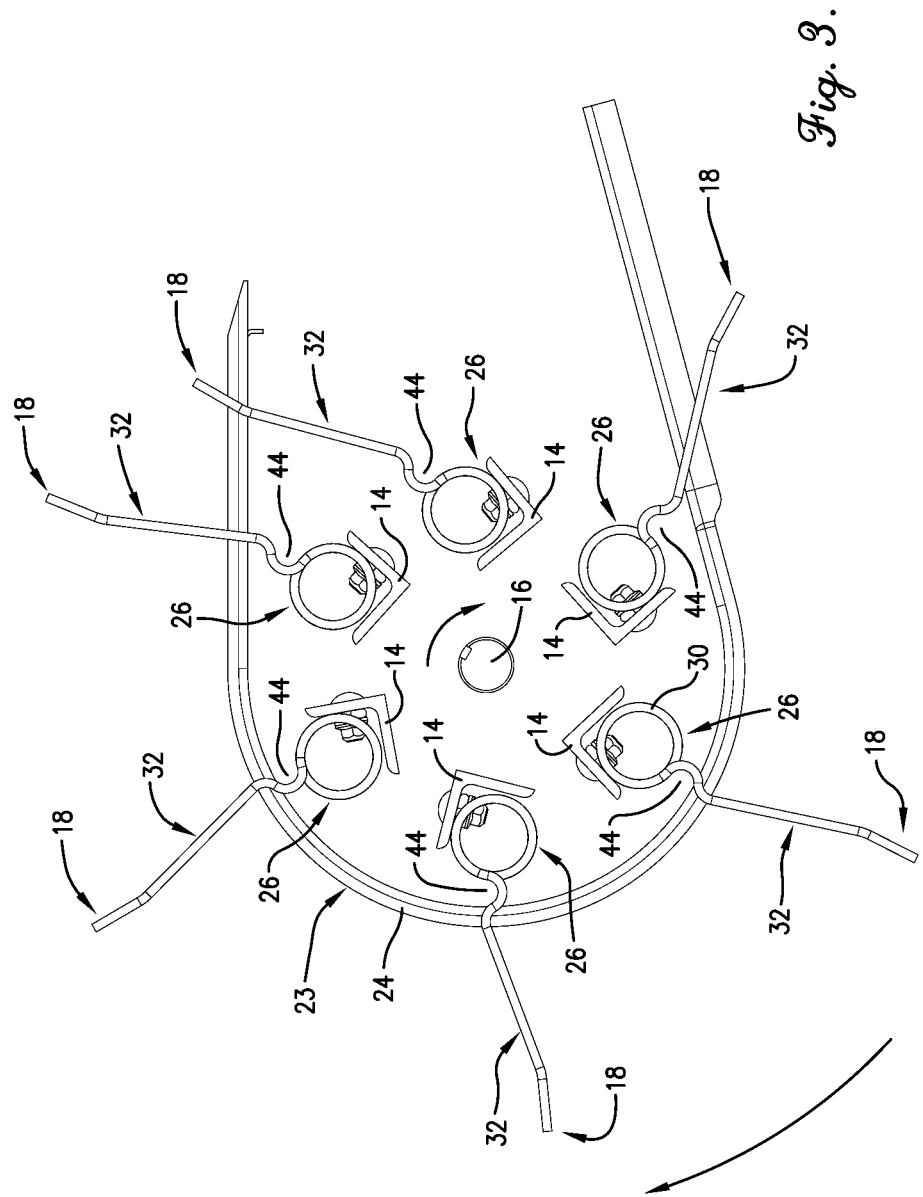
FIG. 3 is a fragmentary, schematic side elevational view of the pickup assembly with parts removed to illustrate the tine bars of the assembly and their orientations at different positions around the circular path of travel of the tine bars.
Figure 4:
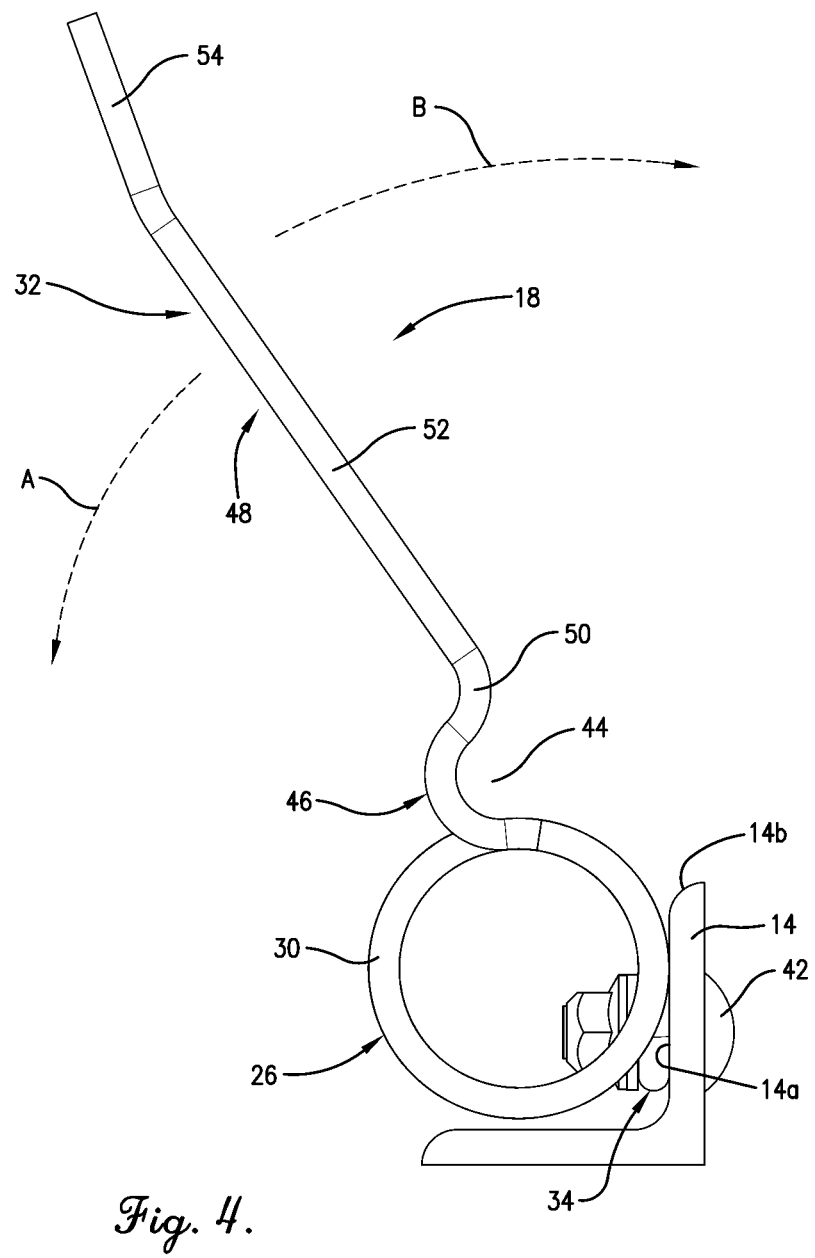
FIG. 4 is an enlarged, end elevational view of one of the support bars and attached tine in accordance with the present invention.

In use, the reel 12 rotates in a clockwise direction as illustrated in FIG. 3. Tines 18 sweep forwardly and upwardly along the front stretch of their path of travel to engage the windrow of crop materials and lift it up into the machine. As each tine 18 encounters the crop material, leg 32 deflects back in a counterclockwise direction under the load of the materials as illustrated by broken arrow A in FIG. 4. This deflected condition continues until the tine releases the crop material, whereupon leg 32 suddenly springs back well beyond its original unloaded position in a forward, clockwise direction as illustrated by broken arrow B in FIG. 4. Even though such spring back may displace leg 32 quite substantially toward bar 14, leg 32 does not strike top edge 14b due to the presence of clearance notch 44. Instead, if leg 32 comes close to bar 14, top edge 14b simply projects safely up into notch 44 without engaging leg 32 at all.

Figure 8:
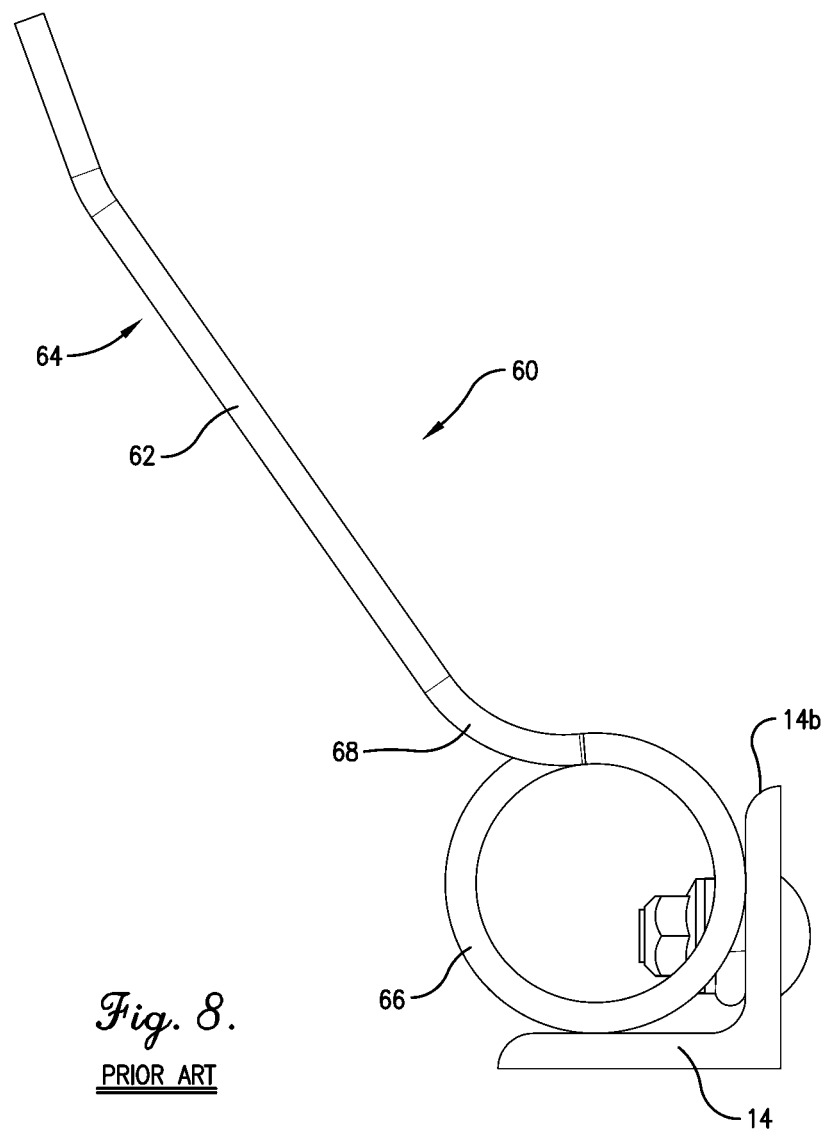
FIG. 8 is a left end elevational view of a prior art support bar and tine.

FIG. 8 shows a prior art tine 60 wherein the straight portion 62 of leg 64 extends generally radially from its coil base 66, rather than tangentially as in the present invention. While such a configuration is satisfactory for a four-bar reel, if additional tine bars are added in an effort to improve pick up quality, there may be a problem with one tine striking the next trailing tine bar during the retracting, strip-out motion of the tines. The back and forth springing action of the tines immediately following release of the load of the crop materials contributes to this problem. If the tine leg 64 is oriented so that straight portion 62 is tangential to base 66, that may solve the space problem with respect to trailing tine bars but also causes a new problem because the inner section 68 of leg 64 strikes the top edge 14b of bar 14 when leg 64 springs back forwardly after releasing the load of the crop materials. By providing clearance notch 44 in tine 18 of the present invention, the straight portion of the tine leg can be configured tangentially to allow more tine bars on the reel, which achieves improved pick up quality without running the risk of breaking the tines against their own support bars.

The inventor(s) hereby state(s) his/their intent to rely on the Doctrine of Equivalents to determine and assess the reasonably fair scope of his/their invention as pertains to any apparatus not materially departing from but outside the literal scope of the invention as set forth in the following claims.

The invention claimed is:

1. A spring tine for attachment to a support member of a crop pickup assembly, said spring tine comprising:
   a single strand of resilient material formed into a base of multiple, side-by-side, helical coils and an elongated flexible leg projecting outwardly from said base, said leg being configured to resiliently deflect back from an unloaded position to a deflected crop pickup position as the leg receives crop material, said leg being formed to present a relief notch in an inner section of the leg adjacent said base, said relief notch being configured to avoid interference with the support member by receiving the support member when the leg is in the spring-back position, said strand being spiraled in a forward direction within said coils and being curved in a reverse direction within said notch.

2. A spring tine as claimed in claim 1,
said leg having an outer section outboard of said notch,
said strand being curved back in said forward direction within a transition region between the notch and said outer section of the leg.

3. A spring tine as claimed in claim 2, said leg curving more than 90° but less than 180° within said notch.

4. A spring tine as claimed in claim 3, said leg curving less than 90° within said transition region.

5. A spring tine as claimed in claim 4, said outer section of the leg including a straight portion that is generally tangent to said base.

6. A spring tine as claimed in claim 5, said straight portion being multiple times the length of said notch.

7. A spring tine as claimed in claim 5, said outer section of the leg further including a tip portion that is angled forwardly relative to said straight portion with respect to the normal direction of crop flow during operation of the pickup.

8. A spring tine as claimed in claim 1,
said leg having an outer section outboard of said notch,
said outer section including a straight portion that is generally tangent to said base.

9. A spring tine as claimed in claim 1, said leg comprising an extension of an end coil of the base.

10. A spring tine as claimed in claim 9, said strand being formed to present a flat arm as a projection of an opposite end coil of the base for use in attaching the tine to the support member.

11. A spring tine as claimed in claim 10,
said leg having an outer section outboard of said notch,
said outer section including a straight portion that is generally tangent to said base and disposed at an acute angle relative to said arm.

12. A spring tine as claimed in claim 1, said strand being formed to present a flat arm projecting from the base for use in attaching the tine to the support member.

13. A spring tine as claimed in claim 1,
said strand further being formed into a second base of multiple, side-by-side, helical second coils and a second elongated leg projecting outwardly from said second base,
said second leg being formed to present a second relief notch in an inner section of the second leg adjacent said second base for avoiding interference with said support member during flexing of the second leg.

14. A spring tine as claimed in claim 13,
said strand being formed to present a flat arm projecting from each of said bases for use in attaching the tine to the support member,
said arms being disposed in spaced, side-by-side relationship and interconnected by a flat bight.

15. A spring tine as claimed in claim 14,
each of said legs having an outer section outboard of its respective notch that includes a straight portion,
said straight portions being generally tangent to their respective bases and being disposed at acute angles with respect to their respective arms.

16. A spring tine as claimed in claim 15,
said strand in one base being spiraled in a direction opposite to the direction of spiraling in the other base,
the strand in each notch being curved reversely to the direction of spiraling of the strand in the base most closely associated with the notch.

17. A spring tine as claimed in claim 16,
each leg having an outer section outboard of its notch and a transition region between the notch and the outer section of the leg,
aid strand in each transition region being curved back in the same direction as the direction of spiraling of the coils in the base most closely associated with the leg.

18. A crop pickup assembly comprising:
a plurality of elongated, parallel, laterally spaced apart support members arranged in a circular pattern and movable in a circular path of travel,
said support members being operable during such movement along said path of travel to oscillate about their respective longitudinal axes; and
a plurality of spring tines attached to each of said support members at spaced locations along the length thereof for lifting crop materials off the ground as the pickup assembly is advanced across a field having crop materials lying thereon and said support members are moved along said path of travel and oscillated in a controlled manner during such movement,
at least one of said spring tines comprising a single strand of resilient material formed into a base of multiple, side-by-side, helical coils and an elongated leg projecting outwardly from said base,
said leg being configured to resiliently deflect back from an unladed position to a deflected crop pickup position as the leg receives crop material,
said leg being flexible forwardly from the crop pickup position beyond the unladed position to a spring-back position as the leg releases the crop material,
said leg being attached to one of the support members and formed to present a relief notch in an inner section of the leg adjacent said base,
said relief notch avoiding interference with the one support member by receiving the one support member when the leg is in the spring-back position.

\* \* \* \* \*